Jan. 6, 1925.
R. HAWKINS
INSECT DESTROYING MACHINE
Filed June 15, 1922    2 Sheets-Sheet 1
1,521,767
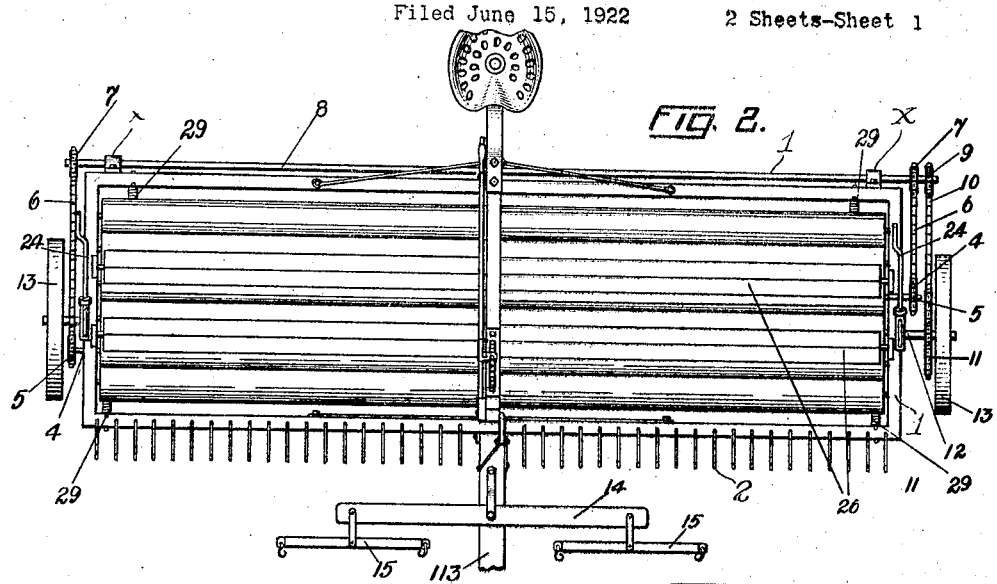
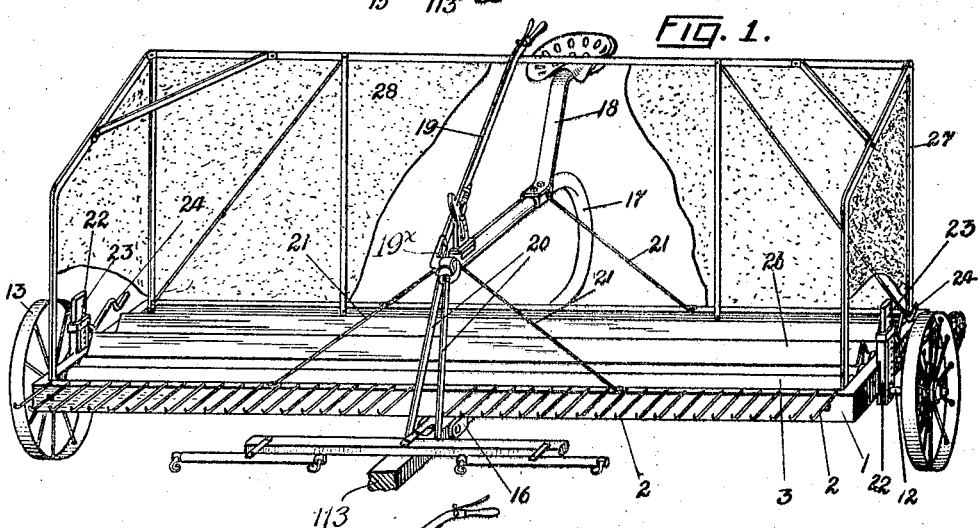
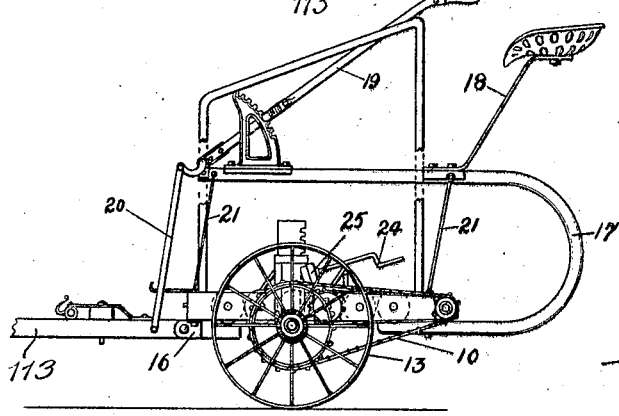
INVENTOR
ROBERT HAWKINS.
By Fetherstonhaugh & Co.
Attys.

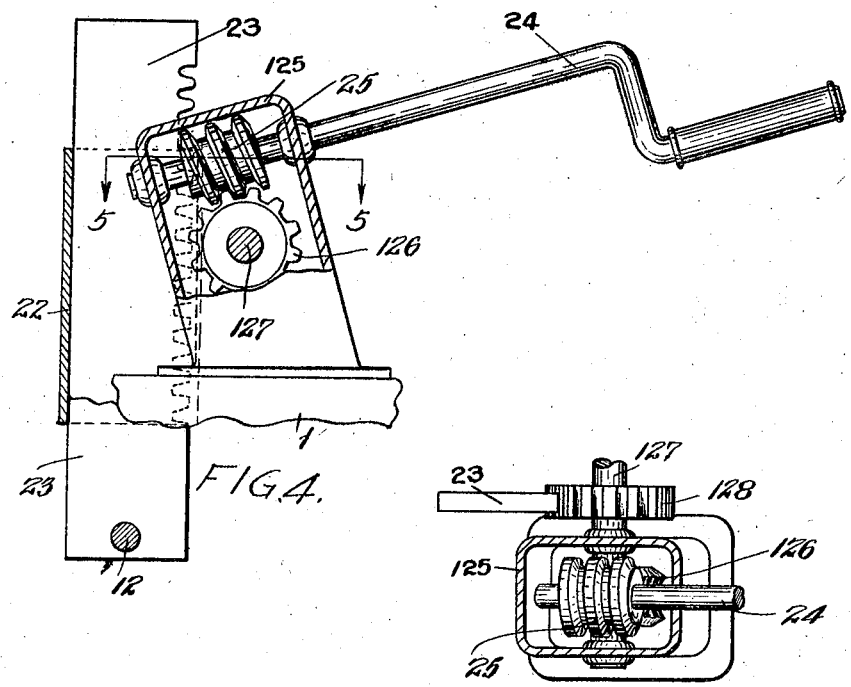
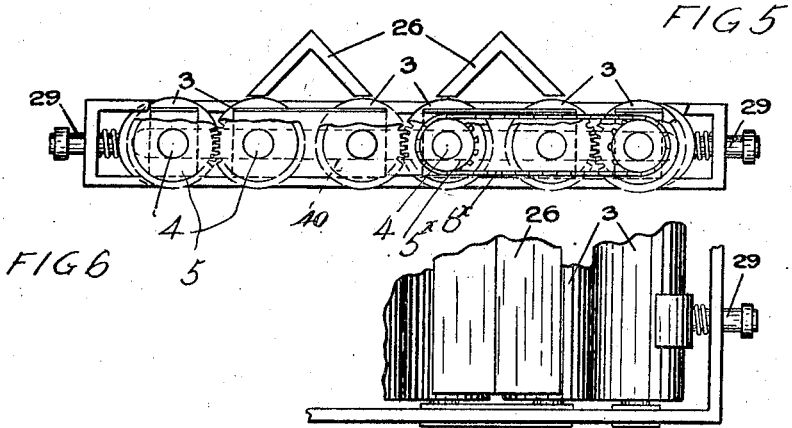

Patented Jan. 6, 1925.

1,521,767

UNITED STATES PATENT OFFICE.

ROBERT HAWKINS, OF WINDTHORST, SASKATCHEWAN, CANADA.

INSECT-DESTROYING MACHINE.

Application filed June 15, 1922. Serial No. 568,501.

*To all whom it may concern:*

Be it known that I, ROBERT HAWKINS, of the village of Windthorst, in the Province of Saskatchewan, Canada, have invented certain new and useful Improvements in Insect-Destroying Machines, of which the following is the specification.

My invention relates to improvements in insect destroying machines and the object of the invention is to devise a wheeled machine that will be of use in exterminating insects from growing crops up to the time of cutting.

A further object is to devise means for disturbing the insects so that they will fly onto the machine wherein they are killed.

Another object is to devise means whereby the machine can be raised or lowered to suit the different crops over which it is operating and a still further object is to devise means for tilting the machine in order that it will more readily pass over obstacles.

My invention consists of an insect destroying machine constructed and arranged all as hereinafter more particularly described and illustrated in the accompanying drawing in which:

Fig. 1 represents a perspective view of a machine constructed according to my invention.

Fig. 2 is a plan view thereof, and

Fig. 3 is a side elevation.

Fig. 4 is a side elevation of the frame elevating mechanism comprising the members 23, 24 and 25.

Fig. 5 is a sectional view on line 5—5 Figure 4.

Fig. 6 is an end view of the roller containing frame and parts coacting therewith.

Fig. 7 is a fragmentary plan view of the part shown in Figure 6 and showing the driving connection between the rollers.

Like characters of reference indicate corresponding parts in the different views.

1 is a substantially rectangular frame provided with the forwardly extending suitably spaced apart tines 2 which serve to stir up the insects and cause them to fly into the machine. 3 are a plurality of laterally extending rollers having reduced ends extending through and journalled in the ends of the frame 1, said rollers engaging one another and certain of the rollers having outwardly extending spindles 4 provided with the sprocket wheels 5 which are connected by the chains 6 to sprocket wheels 7 on the transverse shaft 8 which is suitably journalled in brackets X carried on the rear of the frame 1, said shaft 8 having a sprocket wheel 9 connected by a chain 10 to the driving sprocket 11 on the main axle 12 of the machine, said axle carrying the wheels 13 by means of which the machine is driven.

113 is the tongue provided with the usual double-tree 14 and single-trees 15 to permit horses to be hitched to the machine.

On reference to the Figures 2 and 6 of the drawings it will be seen that the rollers 3 are driven by having alternate rollers provided with a sprocket wheel 5 connected by a chain 6 with a sprocket 7 on the shaft 8 with the exception of the rear roller which is connected through its sprocket 5 by a chain $6^\times$ with an additional sprocket $5^\times$ on the roller third from the rear. The remaining rollers are driven by frictional contact with the sprocket driven rollers. The spindles 4 on the ends of the rollers are inserted into slots 40 in the ends of the main frame 1, and thus the rollers are held in engagement with each other by means of the spring members 29 which bear against the end rollers.

The tongue 113 is pivotally mounted in a forked bracket 16 carried by the frame 1. 17 is a U-shaped bracket extending up from the main portion of the machine and forwardly above the frame 1, said bracket carrying the seat 18 and the lever 19 pivoted at $19^\times$. The lower end $19^\times$ of the lever 19 is provided with the rods 20 connected to the tongue 113 intermediately of the same. 21 are inclined bracket rods secured to the front and back of the frame for preventing distortion of the bracket 17 in a lateral direction.

22 are rack casings secured to the ends of the frame 1 and extending above the main axle 12, said rack casings having the vertical racks 23 freely inserted therein and suitably secured at their lower ends to the main axle 12, said axle being permitted to rotate in such connection. 24 are suitably mounted crank operating handles provided at the forward ends with the worms 25 journalled in the casing 125 and meshing with the worm wheels 126 on the cross shaft 127 which carries the pinion 128 which meshes with the teeth of the rack 23 (see Figure 5).

26 are lateral members of inverted V-shape cross section adapted to guide the insects between the rollers. 27 is a frame extending upwardly around the back and the sides of the frame 1 and provided with the suitable canvas screen 28.

The operation of my machine is as follows:

The machine is driven over the standing crops and the tines 2 disturb the grasshoppers or other insects which may be in the crop, causing them to fly upwardly against the screen 28. From this screen they fall down between the rollers 3 wherein they are crushed to death. The double inclined members 26 aid in guiding the falling insects between the rollers.

The rollers are held in engagement with each other by the main frame and are operated by the driving rollers, which as above described are provided with the spindles 4 driven by a sprocket and chain connection from the shaft 8 which is in turn driven by similar means from the main axle 12. The rollers are held in resilient contact one with the other by means of the springs 29, such rollers being loosely journalled on the main frame 1 as above described. Consequently should any stone or other obstruction get in between the rollers they will be permitted to spread apart sufficiently to avoid any damage thereto or to the driving mechanism, while under the influence of the springs 29 returning immediately to the engaging position when the obstruction is removed.

In addition by rotating the crank rods 24, the frame or table 1 can be raised or lowered as the case may be to suit the height of the crops over which the machine is operating, and further by the actuation of the lever 19 the frame 1 can be tilted by the operator to clear any obstruction that may come in the path of the machine.

From the above description it will be seen that I have devised a simple and effective insect destroying machine which will be simple in use and which will effectively destroy grasshoppers and other insects that are met with in growing crops.

What I claim as my invention is:

1. An insect destroying machine comprising a rectangular frame, a laterally disposed rotatable axle, wheels thereon, laterally extending rollers journalled in the frame, in frictional contact one with the other, a driving connection between the rollers and the axle and a plurality of suitably supported members of inverted V-shape cross section positioned above the rollers and adapted to guide the insects therebetween.

2. An insect destroying machine comprising a rectangular frame, a laterally disposed rotatable axle, wheels thereon, laterally extending rollers journalled in the frame in frictional contact one with the other, a driving connection between the rollers and the axle, a plurality of suitably supported members of inverted V-shape cross section positioned above the rollers and adapted to guide the insects therebetween and an upwardly extending screen extending around the side and back of the frame.

ROBERT HAWKINS.